United States Patent [19]

Scholl

[11] 4,370,268
[45] Jan. 25, 1983

[54] REACTIVE DYESTUFFS

[75] Inventor: Walter Scholl, Cologne, Fed. Rep. of Germany

[73] Assignee: Bayer Aktiengesellschaft, Leverkusen, Fed. Rep. of Germany

[21] Appl. No.: 956,909

[22] Filed: Nov. 2, 1978

[30] Foreign Application Priority Data

Nov. 5, 1977 [DE] Fed. Rep. of Germany ....... 2749647

[51] Int. Cl.$^3$ .................... C09B 62/04; C09B 62/06; C09B 62/08; C09B 62/10
[52] U.S. Cl. ................. 260/146 T; 260/153; 8/537; 8/623; 8/624; 8/686
[58] Field of Search ............ 260/146 T; 8/1 E, 42 R, 8/686

[56] References Cited

U.S. PATENT DOCUMENTS

| | | | |
|---|---|---|---|
| 2,929,809 | 3/1960 | Oesterlein et al. | 260/146 T |
| 2,943,085 | 6/1960 | Oesterlein | 260/146 T |
| 3,429,870 | 2/1969 | Carati | 260/146 T X |
| 3,519,614 | 7/1970 | Powzini | 260/146 T |
| 3,544,547 | 12/1970 | Crabtree et al. | 260/146 T |
| 3,826,799 | 7/1974 | Waring | 260/146 T |
| 4,115,378 | 9/1978 | Bien et al. | 260/146 T |

FOREIGN PATENT DOCUMENTS

| | | | |
|---|---|---|---|
| 2295094 | of 1977 | France | 260/146 T UX |
| 2330739 | of 1977 | France | 260/146 T UX |
| 2357614 | of 1977 | France | 260/146 T UX |

Primary Examiner—Paul F. Shaver
Attorney, Agent, or Firm—Sprung, Horn, Kramer & Woods

[57] ABSTRACT

Reactive dyestuffs of the formula

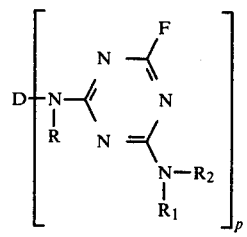

wherein
D, R, $R_1$, $R_2$, n, p, $R_3$, $R_4$ and m have the meaning indicated in the description, and their use for dyeing and printing various materials, above all materials containing hydroxyl groups, such as cotton, linen, cellulose or regenerated cellulose.

12 Claims, No Drawings

REACTIVE DYESTUFFS

The present invention relates to valuable new reactive dyestuffs of the general composition:

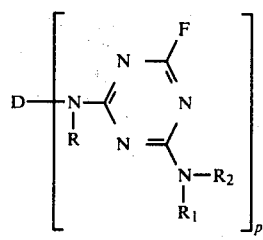

D = the radical of a 1:1 or 1:2 Cr or Co azo complex dyestuff,
R = H or alkyl,
$R_1$ = H or alkyl,
$R_2$ = H, alkyl,

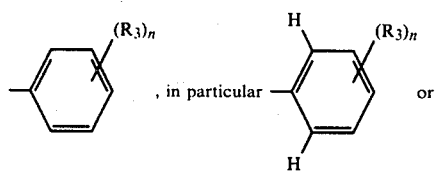

$R_1$ and $R_2$ together alkylene which is optionally interrupted by hetero-atoms,
n = 0, 1, 2 or 3,
p = 1 or 2,
$R_4$ = a substituent, preferably $SO_3H$,
m = 0, 1 or 2 and
$R_3$ = a substituent.

Alkyl is preferably $C_1$-$C_5$-alkyl and can be optionally substituted, for example by halogen, such as Cl, Br and F, OH or $OSO_3H$. Unsubstituted alkyl is preferred.

Examples of suitable substituents $R_3$ and $R_4$ are sulpho, $C_1$-$C_5$-alkyl, $C_1$-$C_5$-alkoxy, halogen, such as Cl, Br and F, and carboxyl.

The radical

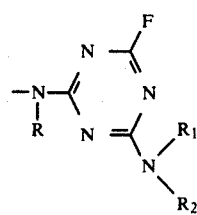

is bonded, directly or via an intermediate member, to a C atom of an aromatic carbocyclic or aromatic heterocyclic ring in D.

Examples of suitable intermediate members are

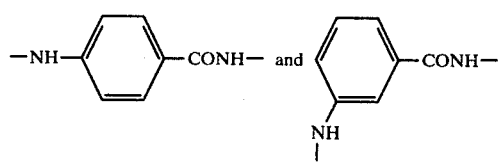

The azo dyestuffs on which the radical D is based are, in particular, of the formula

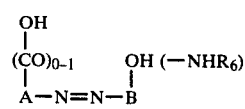

$R_5$ = H, phenyl or $C_1$-$C_5$-alkyl,
wherein

denotes the radical of a diazo component of the benzene or naphthalene series and —B—OH (—$NHR_5$) denotes the radical of a coupling component of the aminobenzene, hydroxybenzene, aminonaphthalene, hydroxynaphthalene, pyrazolone or acetoacetarylide series.

Dyestuffs which are derived from the formula

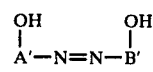

wherein
A' and B' denote sulphonaphthylene radicals which are optionally further substituted,
wherein
B' especially denotes the radical

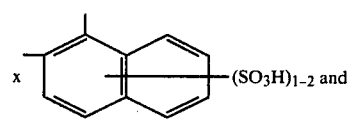

X represents the coupling position, are important.
The two OH groups are in each case in the o-position relative to the azo group.
The radical (II) can be bonded to A or A', or B or B'. (II) is preferably bonded to B or B'.
Preferred dyestuffs are accordingly the 1:1 and 1:2 Cr or Co complexes of the dyestuffs of the formulae

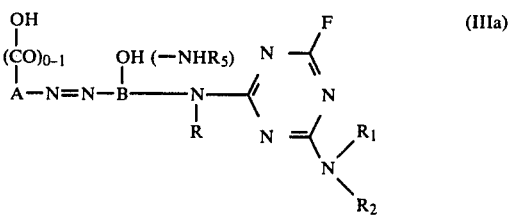

and

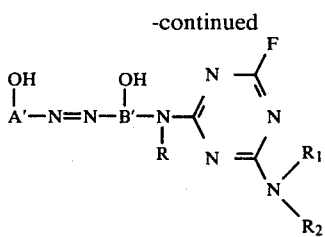

Preferred dyestuffs are, in general, the monoazo dyestuffs, in particular the 1:2 complexes and, in the case of the 1:2 complexes, those in which p=2, and in particular the symmetric dyestuffs.

Within the scope of these dyestuffs, those in which the radical (II) represents

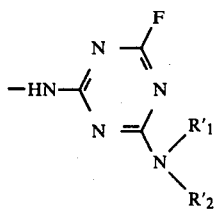

wherein $R'_1$ and $R'_2$ do not simultaneously represent H and contain no substituents which confer water-solubility, are in turn preferred.

The metal-free dyestuffs used as starting compounds can be prepared by combining suitable, substituted diazo components and azo components to give azo dyestuffs of the type indicated, in which procedure either the diazo component or the coupling component must contain a group

or a group which can be converted into such a group, or a group (II).

Examples of suitable diazo components are: 4-nitro-2-aminophenol, 5-nitro-2-aminophenol, 4-nitro-2-aminophenol-6-sulphonic acid, 6nitro-2-aminophenol-4-sulphonic acid, 4,6-dinitro-2-aminophenol, 4-acetylamino-2-aminophenol-6-sulphonic acid, 6-acetylamino-2-aminophenol-4-sulphonic acid, 6nitro-4-acetylamino-2-aminophenol, 6-acetylamino-4-nitro-2-aminophenol, 4-chloro-2-aminophenol, 4,6-dichloro-2-aminophenol, 4-chloro-6-nitro-2-aminophenol, 4-nitro-6-chloro-2-aminophenol, 4-chloro-2-aminophenol-6-sulphonic acid, 6-chloro-2-aminophenol-4-sulphonic acid, 2-aminophenol, 4-methyl-2-aminophenol-, 5-methyl-2-aminophenol, 4-methyl-6-nitro-2-aminophenol, 2-aminophenol-4-sulphonic acid, 2-aminophenol-5-sulphonic acid, 2-aminobenzoic acid, 5-nitro-2-aminobenzoic acid, 4-chloro-2-aminobenzoic acid, 5-chloro-2-aminobenzoic acid, 4-sulpho-2-amino-benzoic acid, 5-sulpho-2-amino-benzoic acid, 1-amino-2-naphthol-4-sulphonic acid and, above all, 6-nitro-1-amino-2-naphthol-4-sulphonic acid.

Examples of suitable coupling components are: 1-hydroxy-8-aminonaphthalene-3,6-disulphonic acid, 1-hydroxy-8-aminonaphthalene-3,5-disulphonic acid, 1-hydroxy-6-aminonaphthalene-3-sulphonic acid, 1-hydroxy-7-amino-naphthalene-3-sulphonic acid, 2-hydroxy-naphthalene, 2-hydroxy-naphthalene-3,6-disulphonic acid, 2-hydroxy-naphthalene-6-sulphonic acid, 1-hydroxy-naphthalene-4-sulphonic acid, 1-hydroxy-naphthalene-3,6-disulphonic acid, 2-hydroxy-3-amino-naphthalene-7-sulphonic acid and 2-hydroxy-3-amino-naphthalene-5,7-disulphonic acid.

In the case where groups which can be converted into a group -NHR are present, this conversion is carried out in a known manner, for example by saponification or reduction, and in particular after the coupling or, preferably, after the metallisation.

For the preparation of the metal complex compounds, the starting dyestuffs are reacted with the corresponding metal-donating agent. It is also possible to carry out the reaction with the metal-donating agent using the starting dyestuffs obtained immediately after the coupling, that is to say without first isolating the monoazo dyestuffs.

Possible metal-donating agents are compounds which donate chromium and cobalt, preferably salts, such as chromium sulphates, chromium acetate, cobalt acetate or cobalt sulphate. It is also possible to use metal-donating agents which contain the metal bonded in a complex, such as, for example, complex chromium or cobalt compounds of aliphatic hydroxycarboxylic acids or dicarboxylic acids and chromium complex compounds of aromatic o-hydroxycarboxylic acids, such as, for example, salicylic acid, and furthermore complex cobalt compounds of the alkali metal salts of aliphatic hydroxy-carboxylic acids.

Examples of aliphatic hydroxycarboxylic acids which may be mentioned are citric acid, lactic acid, glycollic acid and, above all, tartaric acid. The reaction of the starting dyestuffs with the metal-donating agents is advantageously carried out under the influence of heat.

The procedure is appropriately to heat the aqueous mixture obtained during the preparation of the dyestuff to temperatures between 20° C. and 130° C. in a weakly acid or neutral to alkaline range, if appropriate with reflux cooling or in a closed vessel. If necessary, organic solvents, such as alcohol or dioxane, can also be added, or the reaction is carried out in the presence of further agents which promote complex formation, such as, for example, salts of organic acids.

Metal complex dyestuffs with a molar ratio between the metal and the azo dyestuff of 1:1 or 1:2 are obtained in the present processes.

Mixtures of Cr complexes and Co complexes are obtained by mixed metallising. In the case of the 1:2 complexes, symmetric dyestuffs are preferred here.

The dyestuffs obtainable according to the process can contain, in addition to groups which confer water-solubility and at least one optionally substituted amino group -NH-R, where R has the meaning indicated, further substituents which are customary in azo dyestuffs, such as, for example, alkyl, acylamino, arylamino, nitro, cyano, alkoxy and urea groups and halogen atoms, such as chlorine, bromine or fluorine atoms.

The claimed reactive dyestuffs can be obtained from the metal complex dyestuffs containing amino groups either by reaction with a 1,3-difluoro-5-amino-2,4,6-triazine of the formula

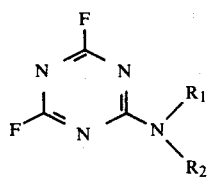

in which

R$_1$ and R$_2$ have the meaning indicated above, or by successive reaction of the metal complex dyestuff containing amino groups with 1,3,5-trifluoro-2,4,6-triazine and then of the product with an amine of the formula

wherein

R$_1$ and R$_2$ have the meaning indicated above.

Examples of possible amines of the formula (VI) are ammonia, methylamine, dimethylamine, ethylamine, propylamine, 2-methylamino-ethanesulphonic acid, sulphuric acid mono-(2-aminoethyl) ester, methylamino-methanesulphonic acid, aminobenzene, 2-, 3- or 4-methyl-aniline, 2-, 3- or 4-methoxyaniline-, 2-, 3- or 4-ethoxyaniline, aniline-2-, -3- or -4-sulphonic acid, 2-, 3- or 4-chloro-aniline, 2-, 3- or 4-bromo-aniline, 2-aminonaphthalene-6-sulphonic acid and 2-aminonaphthalene-4-, -5-, -7- or -8-monosulphonic acid.

The complex dyestuffs obtainable according to the process are compounds which, in the form of their alkali metal salts, for example the Na, K or Li salts, are readily soluble in water and can be used for dyeing and printing the most diverse materials, above all materials containing hydroxyl groups, such as cotton, linen, cellulose or regenerated cellulose. The new metal-containing dyestuffs are used for this purpose in the presence of acid-binding agents in accordance with those dyeing and printing processes such as are generally customary in the art for "reactive dyestuffs".

Processes of this type are known from the literature. (For example Melliand Textilberichte 1959, 539 and 1965, 286).

EXAMPLE 1

A solution of the 1:2 chromium complex of 0.1 mol of the monoazo dyestuff of the formula

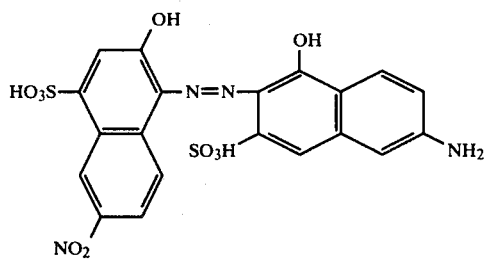

in 690 parts by volume of water is cooled externally to −2° to −4° C. at pH 6 and 13.5 parts by weight of 2,4,6-trifluoro-1,3,5-triazine are added in the course of 10–15 minutes.

The pH is kept at 4.0–6 with 10% strength by volume sodium carbonate solution and the mixture is subsequently stirred for 30 minutes. A solution of 9.3 parts by weight of aniline, 107 parts by volume of water and 8.3 parts by volume of technical grade hydrochloric acid is then added dropwise at 0°–5° C. in the course of one hour and the mixture is subsequently stirred for 3 hours, the temperature of the reaction mixture being allowed to rise to 15°–20° C.

The pH is kept at 4.5–6 with 10% strength by volume sodium carbonate solution. Thereafter, the dyestuff is precipitated with 20% by volume of potassium chloride, filtered off and dried in vacuo at room temperature. Dyeing from a long liquor at 50° C. using sodium carbonate given, on cotton, a greenish-tinged grey with good fastness properties.

Dyestuffs with similar properties are obtained if, instead of aniline, equivalent amounts of 2-methoxy-aniline or 2-methyl-aniline are employed and the procedure is otherwise analogous.

EXAMPLE 2

If the corresponding 1:2 Co complex dyestuff is reacted in an analogous manner with 2,4,6-trifluoro-1,3,5-triazine and the product is then reacted with aniline, a dyestuff which dyes cotton in corinth shades is obtained.

EXAMPLE 3

A solution of the 1:2 Cr complex of 0.2 mol of the monoazo dyestuff of the formula

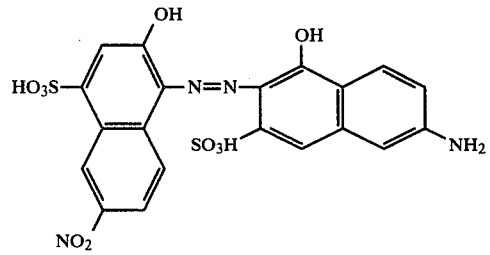

and 1:2 Co complex of 0.1 mol of the same monoazo dyestuff is externally cooled to −2° to −4° C. in 2,000 parts by volume of water at pH 6 and 40.7 parts by weight of 2,4,6-trifluoro-1,3,5-triazine are added in the course of 10–15 minutes.

The pH is kept at 4.0–5.5 with 10% strength by volume sodium carbonate solution. The mixture is subsequently stirred for 30 minutes and a solution of 27.9 parts by weight of aniline, 300 parts by volume of water and 25 parts by volume of technical grade hydrochloric acid is added dropwise in the course of one hour and stirring is continued for a further 3 hours, the temperature of the reaction mixture being allowed to rise to 15°–20° C. The reaction solution is kept at pH 4.5–6 by adding 10% strength by volume sodium carbonate solution.

In order to isolate the dyestuff, 20% by volume of potassium chloride is sprinkled into the mixture and the dyestuff which has precipitated is filtered off and dried at room temperature in vacuo.

The dyestuff dyes cotton in neutral grey shades by all dyeing processes (short and long liquor).

EXAMPLE 4

50 g of cotton hanks are dyed in 1 liter of a dye liquor containing 1.5 g of the dyestuff from Example 3 by adding 50 g of sodium chloride in several portions at 20°–40° C. in the course of 30 minutes, then adding 20 g of sodium carbonate and treating the hanks at the above temperature for 60 minutes. After rinsing, soaping at the boil and drying, a grey dyeing with good fastness to wet processing, rubbing and light is obtained.

All the dyeing processes for dyeing cellulose materials with reactive dyestuffs from a long or short liquor can be used.

EXAMPLE 5

A solution of the 1:2 Cr complex of 0.2 mol of the monoazo dyestuff of the formula

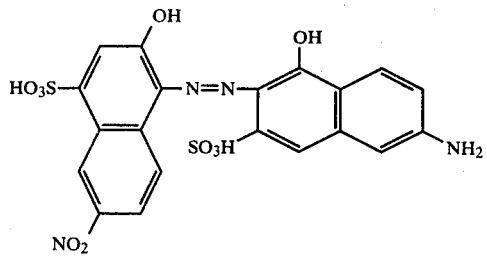

and 1:2 Co complex of 0.1 mol of the same monoazo dyestuff are reacted with 40.7 parts by weight of 2,4,6-trifluoro-1,3,5-triazine as described in Example 3. A solution, rendered neutral with technical grade hydrochloric acid, of 41.7 parts by weight of 2-methylamino-ethane-1-sulphonic acid (=methyltaurine) in 250 parts by volume of water is then introduced at 0°–5° C. in the course of 15–20 minutes, the pH is kept at 5.5–6.5 with 10% strength by volume sodium carbonate solution and stirring is continued for 3 hours, the temperature of the reaction mixture being allowed to rise to 15°–20° C. The dyestuff is then isolated by sprinkling 25% by volume of potassium chloride in.

After filtering off and drying the precipitate in vacuo at room temperature, a reactive dyestuff is obtained which dyes cotton in grey shades with good fastness to wet processing and good fastness to light.

EXAMPLE 6

Cellulose fabric is printed with a printing paste consisting of 80 g of the dyestuff from Example 5, 150 g of urea, 20 g of sodium bicarbonate, 10 g of sodium m-nitrobenzenesulphonate, 240 g of water and 500 g of 4% strength alginate thickener, dried, steamed at 100° C. for 2 minutes, rinsed with hot water and dried. A black reactive print with good fastness to washing and light is obtained.

EXAMPLE 7

0.1 mol of 3-aminobenzene-1-sulphonic acid are dissolved at pH 5 in 350 parts by volume of water with sodium hydroxide solution. The solution is cooled externally to −2° to −4° C. and 13.5 parts by weight of 2,4,6-trifluoro-1,3,5-triazine are added dropwise in the course of 20 minutes.

The pH is kept at 4.0–5.0 with 10% strength by volume sodium carbonate solution. The temperature is −2° to −4° C. A solution of the 1:2 Co complex of 0.1 mol of the monoazo dyestuff of the formula

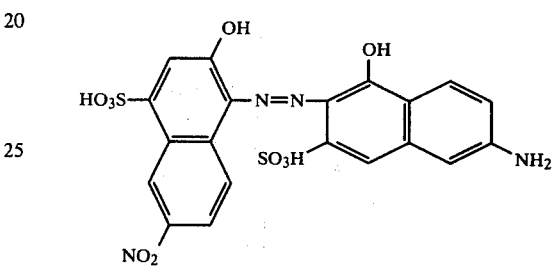

dissolved in 250 parts by volume of water is then allowed to run in at 0° C. in the course of 10 minutes.

The pH is kept at 6 with 10% strength by volume sodium carbonate solution. The reaction mixture is subsequently stirred for 2 hours, the temperature being allowed to rise to 15°–20° C. 25% by volume of potassium chloride is then sprinkled in and the dyestuff which has precipitated is filtered off and dried in vacuo at room temperature. When printed onto cotton under the conditions used for reactive dyestuffs, a corinth with good fastness properties is obtained.

In an analogous manner, the dyestuffs listed in the table can be prepared by one of the processes described.

| Aminoazo dyestuff | Complex-bonded metal | Reactive radical | Colour shade |
|---|---|---|---|
| (COOH, OH, SO₃H, NH₂ structure with N=N) | 1:2 Cr | (F-triazine with NH-phenyl-SO₃H) | brown |
| (OH, OH, NH₂, NO₂, SO₃H structure with N=N) | 1:2 Co | (F-triazine with NH-phenyl-SO₃H) | brown |

-continued

| Aminoazo dyestuff | Complex-bonded metal | Reactive radical | Colour shade |
|---|---|---|---|
| [structure: naphthalene with OH, HO₃S, NO₂, SO₃H, N=N, naphthalene with OH, SO₃H, NH₂] | A mixture of 1:2 Cr and 1:2 Co, molar ratio 2:1 | [triazine with F, NH-C₆H₄-SO₃H (meta)] | black |
| [structure: same as above] | A mixture of 1:2 Cr and 1:2 Co, molar ratio 2:1 | [triazine with F, NH-C₆H₄-SO₃H (ortho)] | black |
| [structure: phenyl with OH, NO₂, N=N, SO₃H, naphthalene with HO, NH₂, SO₃H] | A mixture of 1:2 Cr and 1:2 Co, molar ratio 2:1 | [triazine with F, NH-C₆H₄-SO₃H (meta)] | black |
| [structure: phenyl with COOH, N=N, naphthalene with OH, SO₃H, NH₂] | 1:2 Cr | [triazine with F, NH-C₆H₄-SO₃H (para)] | brown |
| [structure: naphthalene with OH, HO₃S, NO₂, N=N, SO₃H, naphthalene with OH, NH₂] | A mixture of 1:2 Cr and 1:2 Co molar ratio 2:1 | [triazine with F, NH-C₆H₄-SO₃H (para)] | black |
| [structure: phenyl with OH, HO₃S, NO₂, N=N, naphthalene with OH, SO₃H, NH₂] | 1:2 Co | [triazine with F, NH-C₆H₄-SO₃H (para)] | brown |
| [structure: naphthalene with OH, S, NO₂, N=N, SO₃H, naphthalene with HO, NH₂, SO₃H] | A mixture of 1:2 Cr and 1:2 Co, molar ratio 2:1 | [triazine with F, NH-C₆H₄-SO₃H (para)] | black |
| [structure: phenyl with OH, NO₂, N=N, SO₃H, naphthalene with HO, NH₂, SO₃H] | A mixture of 1:2 Cr and 1:2 Co, molar ratio 2:1 | [triazine with F, NH-C₆H₄-SO₃H (para)] | black |

-continued

| Aminoazo dyestuff | Complex-bonded metal | Reactive radical | Colour shade |
|---|---|---|---|
| (OH, HO, NH₂ naphthalene bis-azo with SO₃H, SO₃H; phenyl with NO₂) | A mixture of 1:2 Cr and 1:2 Co, molar ratio 2:1 | triazine with F, NH—phenyl | black |
| (HO₃S, OH naphthalene-N=N-naphthalene with OH, SO₃H, NH₂; NO₂) | 1:2 Co | triazine with F, NH—C₆H₄—OCH₃ | corinth |
| (same as above) | 1:2 Co | triazine with F, NH—C₆H₄—CH₃ | corinth |
| (same as above) | 1:2 Cr | triazine with F, NH—C₆H₄—CH₃ | greenish-tinged grey |
| (same as above) | 1:2 Cr | triazine with F, NH—C₆H₄—OCH₃ | greenish-tinged grey |
| (COOH, phenyl-N=N-naphthalene with OH, SO₃H, NH₂) | 1:2 Cr | triazine with F, NH—phenyl | brown |
| (HO₃S, OH, HO, NH₂ naphthalene with NO₂, SO₃H, SO₃H) | A mixture of 1:2 Cr and 1:2 Co, molar ratio 2:1 | triazine with F, NH—phenyl | black |

EXAMPLE 8

0.1 mol of the 1:1 Cr complex of the monoazo dyestuff of the formula

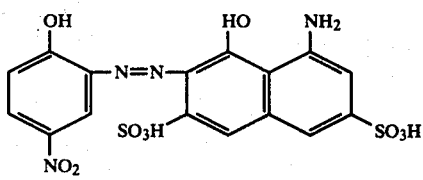

and 0.1 mol of the monoazo dyestuff of the formula

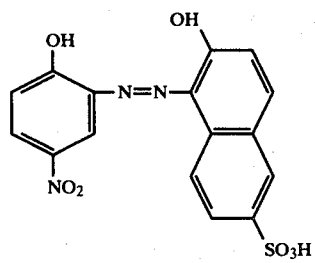

are stirred in 700 parts by volume of water, the mixture is warmed to 70° C. and the dyestuffs are converted into the chromium mixed complex at pH 6-7 in the course of 2 hours. The mixture is cooled externally to −2° to −4° C. and 13.5 parts by weight of 2,4,6-trifluoro-1,3,5-triazine are added dropwise in the course of 20 minutes, the pH being kept at 4.5-5.5 with 10% strength sodium carbonate solution. The mixture is subsequently stirred for 30 minutes and a solution, adjusted to pH 6-7, of 4-aminobenzenesulphonic acid in 70 parts by volume of water is then added. The pH is kept at 4.5-5.5 with 10% strength sodium carbonate solution. Stirring is continued for 4½ hours, and during this the temperature of the reaction mixture is allowed to rise to 15°-20° C. The metal complex reactive dyestuff is separated out by adding 20% by volume of potassium chloride, filtered off and dried in vacuo at room temperature.

In its acid form, the dyestuff corresponds to the formula

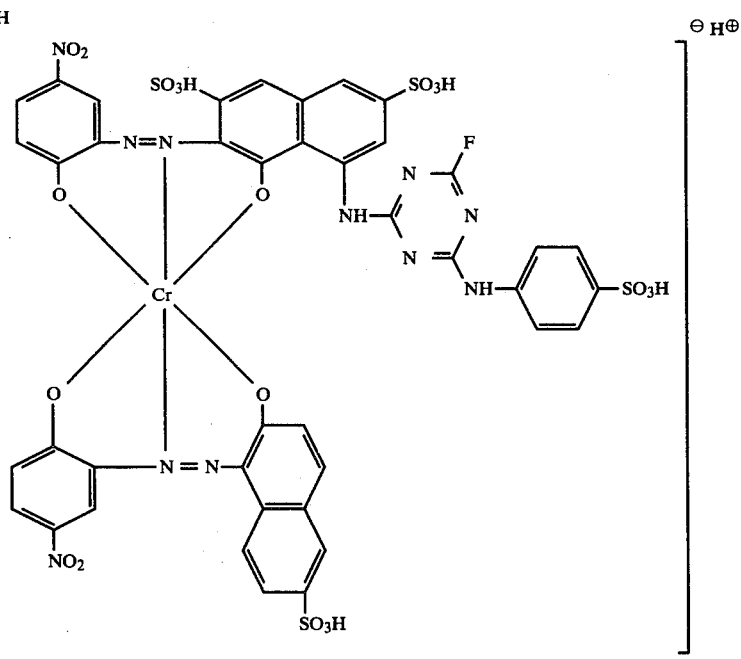

When printed onto cotton under the conditions used for reactive dyestuffs, the dyestuff gives a strong black with good fastness to wet processing and good fastness to light. Valuable reactive dyestuffs can also be obtained in an analogous manner from the starting components listed in the table, the reactive group being bonded to the amino group in the dyestuffs of columns 1 or 2.

Instead of reacting the dyestuffs with the reactive components of column 3, it is also possible to first react them with trifluorotriazine and then to react the product with aniline.

| 1:1 Cr complex dyestuff | Metal-free dyestuff | Reactive component | Colour shade |
|---|---|---|---|
| 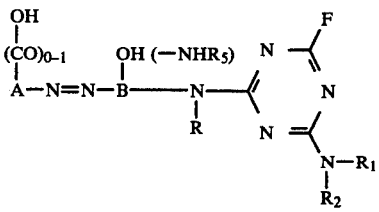 | | | olive |

I claim:
1. Reactive dyestuffs of the formula

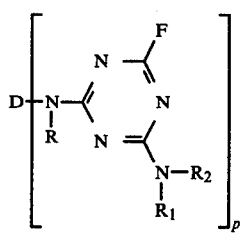

D = the radical of a 1:1 or 1:2 Cr or Co azo complex dyestuff,
R = H or $C_1$–$C_5$-alkyl which is unsubstituted or substituted by chloro, bromo, fluoro, hydroxy or sulfo,
$R_1$ = H or $C_1$–$C_5$-alkyl which is unsubstituted or substituted by chloro, bromo, fluoro, hydroxy or sulfo,
$R_2$ = H, alkyl,

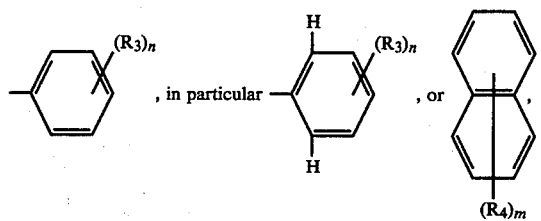

n = 0, 1, 2 or 3,
p = 1 or 2,
$R_4$ = sulfo, carboxy, $C_1$–$C_5$-alkyl, $C_1$–$C_5$-alkoxy, chloro, bromo or fluoro,
m = 0, 1 or 2 and
$R_3$ = sulfo, carboxy, $C_1$–$C_5$-alkyl, $C_1$–$C_5$-alkoxy, chloro, bromo or fluoro,
the radical

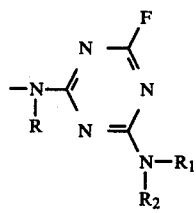

being bonded, directly or via an intermediate member, to a C atom of an aromatic-carbocyclic or aromatic-heterocyclic ring in D.

2. 1:1 and 1:2 Cr or 1:2 Co complexes of dyestuffs of the formula

wherein
$R_5$ = H, phenyl or $C_1$–$C_5$-alkyl and the radicals —(CO)$_{0-1}$OH and —OH (—NHR$_5$) are in the o-position relative to the azo bridge, and wherein (CO)$_{0-1}$OH denotes the radical of a diazo component $-\overset{|}{A}-$ of the benzene or naphthalene series and —B—OH (—NHR$_5$) denotes the radical of a coupling component of the aminobenzene, hydroxy-benzene, aminonaphthalene, hydroxynaphthalene, pyrazolone or acetoacetarylide series,
and wherein
R, $R_1$ and $R_2$ have the meaning indicated in claim 1.

3. 1:1 and 1:2 Cr or 1:2 Co complexes of dyestuffs of the formula

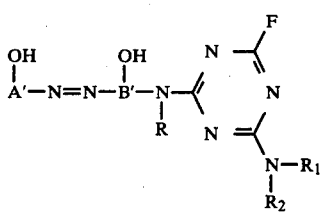

wherein
A' and B' denote sulphonaphthylene radicals which are optionally further substituted,
wherein
R, $R_1$ and $R_2$ have the meaning indicated in claim 1.

4. Symmetric 1:2 Cr or 1:2 Co complexes of the dyestuffs of claims 1, 2 or 3.

5. Use of the dyestuffs of claims 1, 2 or 3 for dyeing and printing materials containing OH or materials containing N, dyed and printed with the dyestuffs of claims 1, 2 or 3.

6. Materials containing OH or materials containing N, dyed and printed with the dyestuffs of claims 1, 2 or 3.

7. A reactive dyestuff of claim 1 having the formula

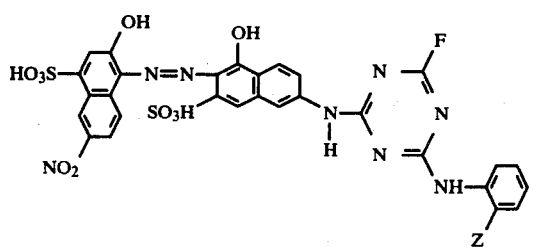

wherein Z is H, methyl or methoxy and the azo dyestuff portion is in the form of the 1:2 chromium complex.

8. A reactive dyestuff of claim 1 having the formula

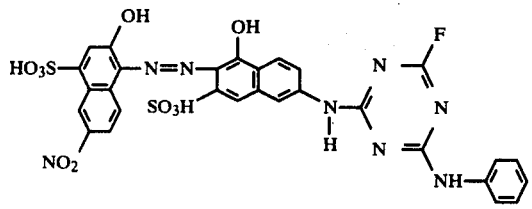

wherein the azo dyestuff portion is in the form of the 1:2 cobalt complex.

9. A reactive dyestuff of claim 1 having the formula

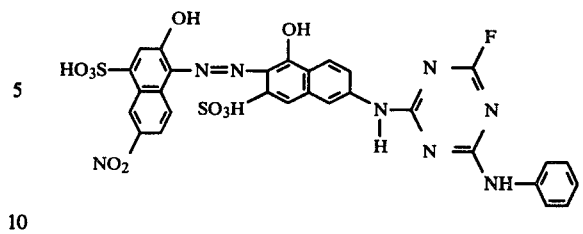

wherein ⅓ of the azo dyestuff portion is in the form of the 1:2 cobalt complex.

10. A reactive dyestuff of claim 1, wherein $R_3$ and $R_4$ are each sulpho, $C_1$–$C_5$-alkyl, $C_1$–$C_5$-alkoxy, halogen or carboxy.

11. A reactive dyestuff of claim 10, wherein $R_4$ is sulpho.

12. A reactive dyestuff of claim 3, wherein B' denotes the radical

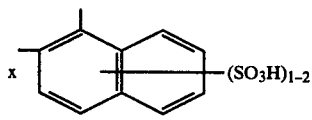

(x = the coupling position)

* * * * *